US012043118B2

(12) United States Patent
Timenes et al.

(10) Patent No.: US 12,043,118 B2
(45) Date of Patent: Jul. 23, 2024

(54) ROLLING DEVICE

(71) Applicant: WHEEL.ME AS, Oslo (NO)

(72) Inventors: Atle Timenes, Snarøya (NO); Rolf Libakken, Båtsfjord (NO)

(73) Assignee: WHEEL.ME AS, Oslo (NO)

( * ) Notice: Subject to any disclaimer, the term of this patent is extended or adjusted under 35 U.S.C. 154(b) by 273 days.

(21) Appl. No.: 17/781,461

(22) PCT Filed: Nov. 30, 2020

(86) PCT No.: PCT/EP2020/083915
§ 371 (c)(1),
(2) Date: Jun. 1, 2022

(87) PCT Pub. No.: WO2021/110587
PCT Pub. Date: Jun. 10, 2021

(65) Prior Publication Data
US 2023/0001778 A1  Jan. 5, 2023

(30) Foreign Application Priority Data

Dec. 6, 2019 (NO) .................................... 20191445

(51) Int. Cl.
*G01M 7/02* (2006.01)
*B60B 33/00* (2006.01)
(Continued)

(52) U.S. Cl.
CPC ........ *B60K 7/0007* (2013.01); *B60B 33/0005* (2013.01); *B60B 33/0028* (2013.01); *B60K 17/043* (2013.01); *B60B 33/0044* (2013.01)

(58) Field of Classification Search
CPC .............. B60K 7/0007; B60B 33/0028; B60B 33/0044; B60B 2340/14
See application file for complete search history.

(56) References Cited

U.S. PATENT DOCUMENTS

2002/0003375 A1  1/2002  Kuo
2006/0112514 A1*  6/2006  Libakken ................ B60B 33/08
16/21

FOREIGN PATENT DOCUMENTS

CN   201300878   9/2009
CN   104108414   10/2014
(Continued)

OTHER PUBLICATIONS

International Search Report and Written Opinion of the International Searching Authority issued Mar. 19, 2021 in International (PCT) Application No. PCT/EP2020/083915.
(Continued)

*Primary Examiner* — Muhammad S Islam
(74) *Attorney, Agent, or Firm* — Wenderoth, Lind & Ponack, L.L.P.

(57) ABSTRACT

Rolling device comprising a housing (11) accommodating a rolling element and a control and communication module comprising a wireless receiver (30) connected to a control device (40) and position means (50) connected to the control device, wherein the rolling device further comprises driving means (60) connected to the control device and the rolling element for driving and controlling the movements of the rolling element according to a first position acquired by the position means and a received wireless signal comprising movement instructions and a second position, power supply means (70) for powering the control and communication module and the driving means, wherein the housing is arranged with an support assembly for bearing the rolling element which is configured for establishing a releasable connection with the housing, and an electrical interface adapted for establishing connection between the rolling element and the control and communication module and the power supply means.

10 Claims, 12 Drawing Sheets

(51) Int. Cl.
*B60K 7/00* (2006.01)
*B60K 17/04* (2006.01)

(56) References Cited

FOREIGN PATENT DOCUMENTS

| | | |
|---|---|---|
| KR | 20-2011-0006382 | 6/2011 |
| KR | 10-1964847 | 4/2019 |
| NO | 316760 | 4/2004 |
| WO | 2015/118492 | 8/2015 |
| WO | 2018/138320 | 8/2018 |

OTHER PUBLICATIONS

Search Report issued Jun. 19, 2020 in Norwegian Application No. 20191445 with English translation.

* cited by examiner

ROLLING DEVICE

TECHNICAL FIELD

The present invention concerns a rolling device for mounting or integration into a device for enabling the movement of device along a surface. The rolling device may be remotely controlled and may be arranged for automatically moving a group of devices according to pre-set scenarios.

More specifically the device to be moved may be suitable both for indoor and outdoor use. The device for indoor use is typically a piece of furniture or an interior building element such as a wall or a door. For outdoor use the rolling device may be used for instance for moving euro pallet or other devices that are cumbersome to move.

The invention is suitable for moving all kind of devices that is to be moved between different locations both indoors and outdoors, where the movement is to occur along a surface, for instance a floor.

BACKGROUND

Various devices and especially furniture, may be provided with wheels or roller elements for facilitating the movement of devices from one location to another, for instance for regrouping devices or moving a device to get access to the space the device occupies or to provide access to the device itself.

The applicant has previously developed a rolling device capable of being integrated in devices, such as a piece of furniture, a movable wall etc., for moving the device along a surface. The rolling device facilitates the moving of an object and can be used by everyone regardless of physical condition and capacity to lift different devices in which the rolling device is integrated. This device is described in Norwegian Patent NO 316760 B1.

The rolling device of NO 316760 B1 comprises a cylindrical sleeve device for mounting in, for example, the leg of a piece of furniture, and a piston that is movably arranged in the cylindrical sleeve device. A ball-shaped or spherical wheel is arranged in the piston. The piston is movable, with the aid of a click system comprising a spring, between an upper position and a lower position. When the piston is in the lower position, the piece of furniture can be rolled across the floor it is standing on, whilst when the piston is in the upper position, the wheel is inside the cylindrical sleeve device and the leg of the piece of furniture, in which the rolling device is arranged, thus stands on the floor. The piece of furniture thus stands in the desired position without rolling inadvertently across the floor when small forces are applied to the piece of furniture. The solution is completely mechanical.

The applicant has further developed the concept and provided a rolling device with an automatic actuator system for moving a piston with a rolling element between an upper and lower position. This concept is disclosed in EP 3102429. The upper position is a passive stationary position where the wheel element is retracted in the rolling device, and the lower position is an active position for moving the rolling device along a surface. The actuator can be wirelessly controlled.

In a further version as described in WO 2018138320, the applicant has evolved the concept of the rolling device further. WO 2018138320 presents a rolling device for arrangement for autonomously moving a device from a first position to a second position along a surface. The rolling device controls the movements of a rolling element according to position acquisitions and given position and movement instructions. The rolling element may have a set or fixed vertical position relative to the rolling device or may be arranged for displacement between a retracted position where the wheel element is prevented from moving along a surface and an extended position where the wheel element is prepared for movement along the surface, as described in EP 3102429 and NO 316760 B1.

The rolling device as described in the publications of the applicant as described above, comprises interacting mechanical components and electrical components. When there is a need for repair or if one the components needs to be exchanged with a new or alternative one, the procedure for disengage and later engage the component in question, involves the complexity of all interacting components. Whereas most of the components of the roller device is stationary, the rolling element is moving and is exposed to wear and thus requires replacement from time to time. Consequently, a need has evoked for facilitating the replacement of one of the components of the rolling device, such as the roller element.

The object of the present invention is therefore to provide a rolling device capable of a simple and reliable arrangement for disassembly and assembly for replacement of the roller element. It is further an object of the invention to provide a solution that minimizes the costs for replacing the roller element, and also makes it possible for the customer or user of the roller device to replace the roller element, without the expertise of the skilled mechanic.

Another example is to integrate one or more rolling arrangements in a supporting structure or framework for transporting different product form one location to another along a surface.

The rolling arrangement can be used both indoor and outdoor. It can be used onshore and offshore, e.g. offshore installations such as rigs and on decks of ships.

The rolling arrangement according to the invention can be integrated in a device when the device is produced, or it may be retrofitted in a device not initially intended to be movable. The invention can be used both indoor and outdoor of buildings.

These and other characteristics of the invention will be clear from the following description of an exemplary embodiment, given as a non-restrictive example, with reference to the attached drawings.

SUMMARY OF THE INVENTION

The present invention relates a rolling device for a device to enable moving the device along a surface. The rolling device may typically be configured for engagement with a device such as piece of furniture of various kind, a euro pallet or other devices where the moving is facilitated by the use of one or more rolling devices. The rolling device may be mounted to the device in various ways; by integration of the rolling device into a cavity in the device to be moved (for instance a part of the furniture), by mounting the rolling device directly or indirectly to the device to be moved by fixation means.

The rolling device comprises a housing arranged for attachment to the device and arranged for accommodation of a rolling element. The housing is arranged for accommodation of a control and communication module comprising; a wireless receiver connected to a control device, position means connected to the control device for acquiring the position of rolling device relative to its surroundings. The roller device further comprises driving means connected to the control device and the rolling element for driving and controlling the movements of the rolling element according to the first position acquired by the position means, and a received wireless signal comprising movement instructions and the second position. Further the roller device comprises power supply means for powering the control and communication module and the driving means.

The housing is further arranged with a support assembly for bearing the rolling element and is configured for establishing a releasable connection with the housing. The housing also comprises an electrical interface adapted for establishing connection between the rolling element and at least one of the control and communication module and the power supply means.

By the arrangement of the rolling device in accordance with the invention, the support assembly carrying the rolling element may easily be released from the housing by applying a release force as typically be provided by a handgrip pulling force from a user.

The rolling element may comprise various elements such as an ordinary wheel shape or having more of a ball shape or a spherical shape or any other shape capable of providing a rolling movement in interaction with a surface.

The rolling element may typically comprise a wheel element arranged with a wheel axle. And in that case the support assembly may comprise a first and a second wheel bearing member each connected to an end portion of the wheel axle. The first wheel bearing member may be releasably arranged in a first guiding recess arranged in the interior of the housing. The second wheel bearing member may be releasably arranged in a second guiding recess arranged in the interior of the housing. The first and second guiding recesses may be configured in the inner wall of the housing or in a construction component installed in housing. The first wheel bearing member, the second wheel bearing member carrying the wheel element is to be released from and installed into the housing as a unit.

One example of a wheel for use with the rolling device is a Mecanum wheel. The Mecanum wheel has a configuration allowing movement in any direction, and it is a conventional wheel with a series of rollers attached to its circumference. These rollers may typically each have an axis of rotation at 45° to the plane of the wheel and at 45° to a line through the centre of the roller parallel to the axis of rotation of the wheel but may of course also be arranged with axis of rotation having other inclinations than 45°.

Also, when the rolling element has more of a ball shape or a spherical shape the support assembly carrying the rolling element may be releasably arranged in first and second guide recesses in the interior of the housing. The guide recesses may then have a configuration where the support assembly with the rolling element fits into place when positioned at a designated installation position and may further be arranged with inclined portions of the guide recesses for easing the support assembly with the rolling element into and out of installation position. In this case the support assembly may also be released by a handgrip pulling force from a user.

The rolling device may further comprise attachment means for establishing releasable connection between the support assembly and the housing. These attachment means may be selected among the following devices; magnets, click/out connection, releasable claw connection, plug and socket connection.

The rolling device may further comprise a first guide member arranged in the first guiding recess. The first guide member may be arranged for establishing releasable connection with the first wheel bearing member, for instance by the use of the previously mentioned attachment means. Further, the rolling device may comprise a second guide member arranged in the second guiding recess. The second guide member may be arranged for establishing releasable connection with the second wheel bearing member, for instance by the use of the previously mentioned attachment means.

The rolling device may comprise a drive motor for displacement of the the first guide member and the first wheel bearing member when connected as a unit by the attachment means. The united first guide member and the first wheel bearing member is displaced in the first guide recess. Further the drive motor is arranged for displacement of the second guide member and the second wheel bearing member when connected as a unit by the attachment means. The united second guide member and the second wheel bearing member is displaced in the second guide recess. The displacement of the these units in their respective guide recess by the drive motor causes the movement of the rolling element into an extended position where a portion of the rolling element projects outside the housing and a retracted position where the rolling element is located inside the housing.

The drive motor may be arranged with a spindle connected to a bridge structure by means of a toothed intermeshing arrangement. The bridge structure may be arranged with a first attachment section connected to the first guide member, and a second attachment section connected to the second guide member for displacement of the wheel element between an extended and retracted position.

In an alternative version the drive motor may be arranged with a centred spindle having two free end portions wherein
- one of the end portion forms a toothed intermeshing engagement with a first attachment section connected to the first guide member,
- the other end portion forms a toothed intermeshing engagement with a second attachment section, for displacement of the wheel element between an extended and retracted position.

The electrical interface may comprise a wired interface or wireless interface for communication to and from the roller element. When the electrical interface comprises a wired interface, a releasable electrical connection may be provided to ensure the release of the support assembly from the housing. The second guide member may then comprise first connector parts and the second wheel bearing member may comprise second connector parts. The first and second connector parts may then be arranged in a releasable connection and may be arranged as plugs and sockets.

The guide member (s), wheel bearing member(s), interior housing part(s), and the wheel element, may be arranged as a module unit such as a cassette to be inserted into and removed from the housing. The drive motor may have a location above the wheel element or a location laterally displaced from the wheel element.

The driving means may typically be arranged in the interior of the rolling element but may also be located elsewhere in the rolling device. A gear mechanism may also be arranged in the in the interior of the rolling element, and the rolling element may for instance be provided as a hub wheel.

The driving means and gear mechanism may alternatively be located above the wheel element or in a position laterally displaced from the wheel element. However, the driving means and gear mechanism may then still be integrated as a part of the module unit.

BRIEF DESCRIPTION OF THE DRAWINGS

In the following, embodiments of the present invention will be described in detail with reference to the enclosed drawings, where:

FIG. 1 illustrates a schematic set up of different components and devices of the rolling device for mounting to, or integration into a device for enabling the movement of device along a surface. The device to be moved may be a piece of furniture for domestic or institutional use, a movable wall, a door, carriages for various use indoors and outdoors. The rolling device may be applicable for all kind of devices which are not originally provided with wheels or roller elements, and when experiencing a need for relocation, the provision of these rolling means facilitates the moving.

Figure 1:
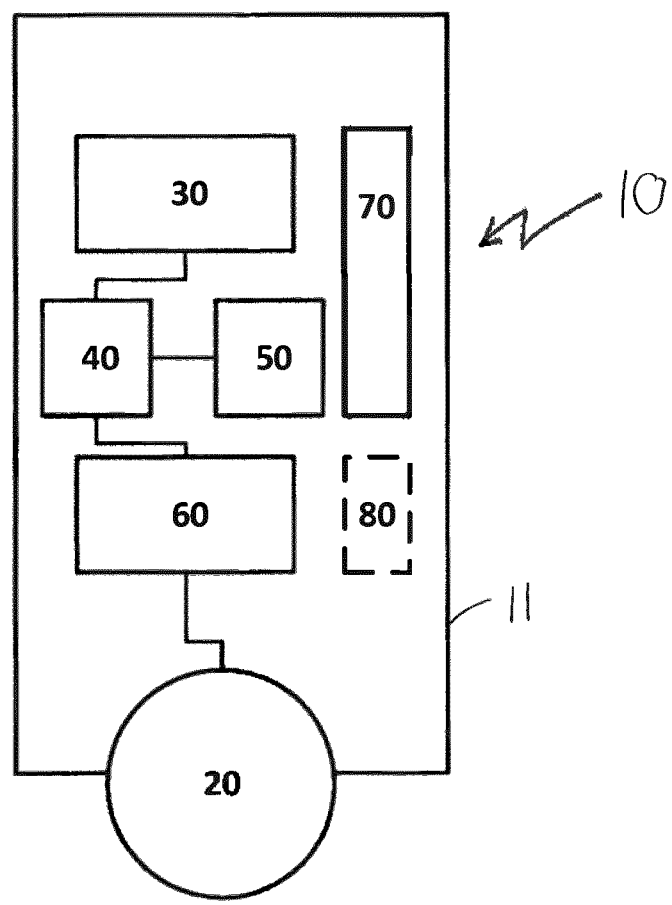
FIG. 1 is a schematic illustration of the main components of the rolling device.

The rolling device 10 as shown in FIG. 1 is arranged with a housing 11 and is provided with a rolling element 20 arranged at a one end of the housing 1. The rolling element is to engage the surface when the moving of the device is to be carried out.

The rolling element 20 may be arranged in a set position located at the end of the housing, typically the lower end of the housing when in installed position as connected to the device to be moved. In an alternative version the roller element may be movably arranged in the housing between an upper and lower position. The upper, retracted position is a passive stationary position where the wheel element is retracted in the rolling device, and the lower position is an extracted active position for moving the rolling device along a surface.

Various devices for controlling the rolling element 20 may be arranged in the housing 11. As shown in FIG. 1, a wireless receiver 30 and a control device 40 are located in the housing. The wireless receiver 30 and the control device 40 are signally connected to each other, and the receiver 30 is arranged for receiving wireless control signals. The rolling device 10 is arranged with position means 50 for acquiring the position of rolling device 10 relative to its surroundings. The position means 50 is connected to the control device 40.

There are different ways of detecting and acquiring the position of the rolling device 10. One example is determining the position from an external device such as a camera or by using Lidar for measuring the distance from a reference point to the rolling device 10. Another example is to use an RFID chip connected to the rolling device 10 or to the device to be moved. Yet another way is by using ultrasound transmitter or a Bluetooth transmitter connected to the rolling device 10 for determining the position of the rolling device 10. Accurate position can then be found by means of triangulation.

The position can then be transmitted to the position means 50 of the rolling device 10. These are all well-known methods and will not be described further here.

Driving means 60 are connected to the control device 40 and the rolling element 20 for driving and controlling the movements of the rolling element 20 according to the first position is acquired by the position means 50 and a received wireless signal comprising movement instructions and the second position. In FIG. 1, the driving means 60 are shown arranged in the housing, but as an alternative the driving means 60 may be arranged in the rolling element 20. The rolling element 20 may then be arranged with an interior space capable of housing the driving means 60.

Different types of known driving means for moving the rolling element 20 are feasible. In another embodiment, the rolling element 20 is driven by a chain connected to a motor. The motor is preferably an electric or electromagnetic motor.

The wireless receiver 30, the position means 50 and the control device 40 may for simplifying reasons hereafter be named a control and communication module.

A power supply means 70 for powering the driving means and the different electronic devices may be provided in different ways. The power supply means 70 may comprise a common power supply system for supplying power both to the control and communication module and to the driving means. Alternatively, the power supply means may comprise two separate power supply systems; one for supplying power to the control and communication module and the other to the driving means. The power supply means 70 may typically be located in the housing 11 as illustrated in FIG. 1. But, when the power supply means 70 is provided as two separate power supply systems and the driving means 60 is located in the rolling element 20, the power supply system for supplying power to the driving means 60 may be located in the in the rolling element 20.

The power may be provided by a battery connected to the electronic devices. In another embodiment, the power may be provided by wireless power transfer means based on time-varying electric, magnetic, or electromagnetic fields. A receiver for receiving field energy is the placed in the housing of the rolling device 10. Received field energy is then converted to an electrical current that is used as the power source for the different electronic devices arranged in the housing. In another embodiment of the invention, wireless power transfer is used for charging a battery connected to the electronic devices arranged in the housing.

The rolling device 10 works as follows: the control device 40 receives movement instructions by means of a wireless receiver 30. The control device 40, which is connected to the receiver 30, may comprise a micro-controller interpreting and acting to a transmitted sequence comprising movement instructions. Upon receiving movement instructions, the rolling device 10 will request its position relative to its surroundings from the position device 50. This is current and first position.

When current position is established, movement instruction for controlling the movement of the rolling element 20 is executed in the control device 40. The movements are based on said acquired first position of the rolling device 10 and the received movement instructions comprising a route and a second position. The rolling device 10 is then ready to move the device from the first to the second position according to the route.

In one embodiment of the invention, the rolling device 10 further comprises a wireless transmitter 80. This embodiment is useful for coordinating simultaneous operation of a set of several rolling arrangements 10.

The wireless receiver 30 receives movement instructions for the rolling device 10. Instructions may for instance be transmitted via a remote control, a tablet or a smart phone with an installed application for controlling different scenarios, pre-set or generated on the spot.

Figure 2:
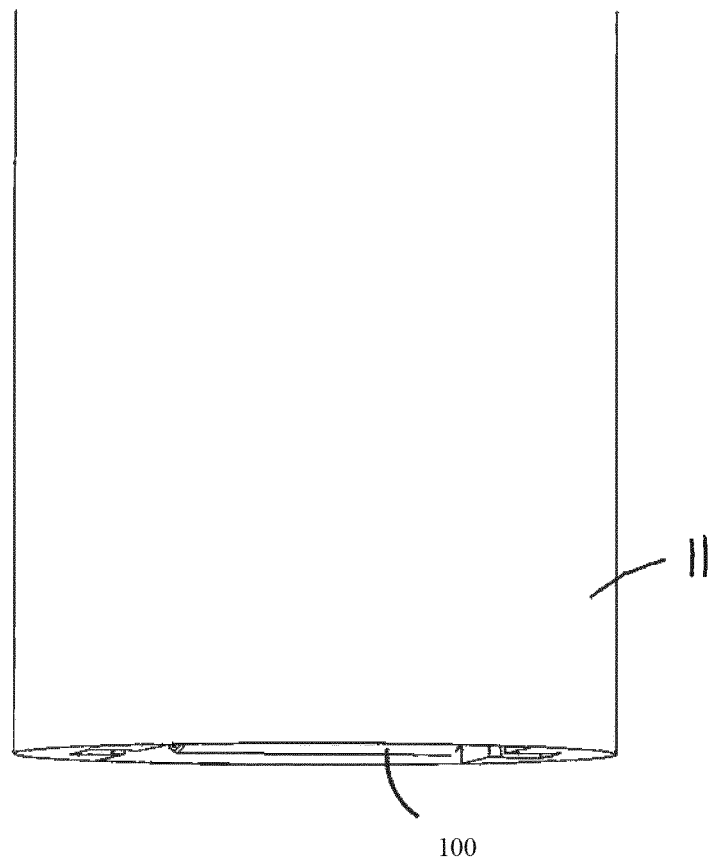
FIGS. 2 and 3 are two schematic side views of the rolling device with the rolling element in two different positions.

In the example as shown in FIG. 2 and the following figs, the rolling element is shown as wheel element 100.

FIG. 2. shows the rolling device with the wheel element 100 in its retracted position locating the wheel element 100 inside the housing 11.

Figure 3:
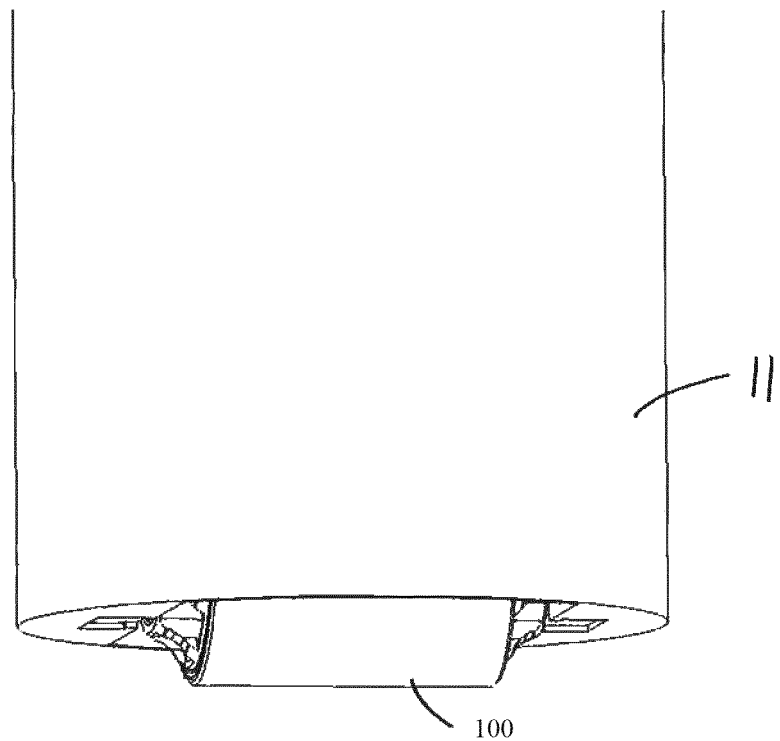

In FIG. 3, the wheel element 100 is shown in an extended position where at least a portion of the wheel element 100 projects outside the housing 11.

Figure 4:
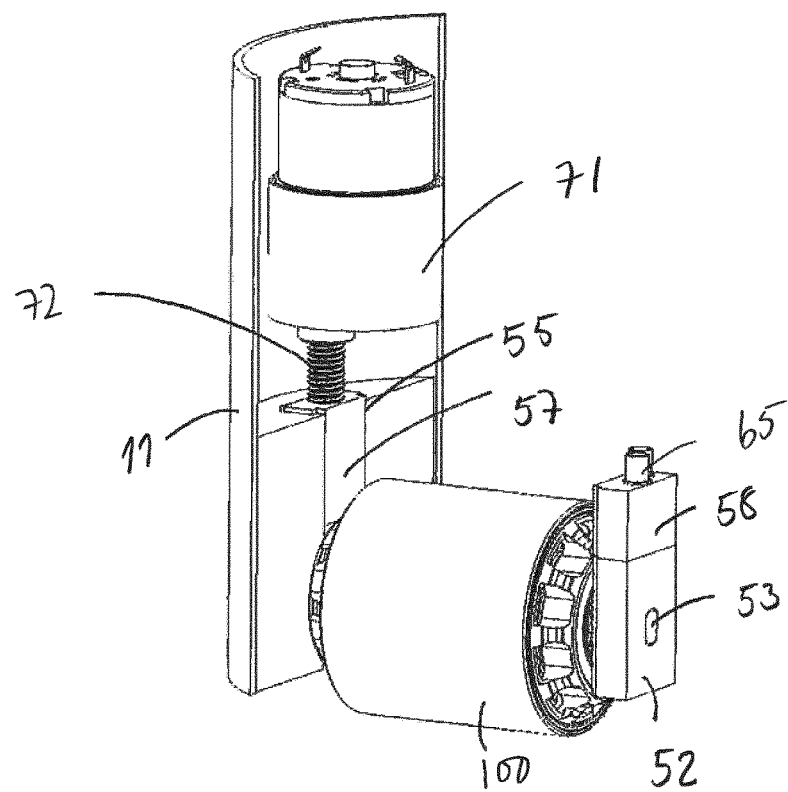
FIG. 4 is a perspective view of the rolling device arranged for the release of the wheel element.
Figure 5:
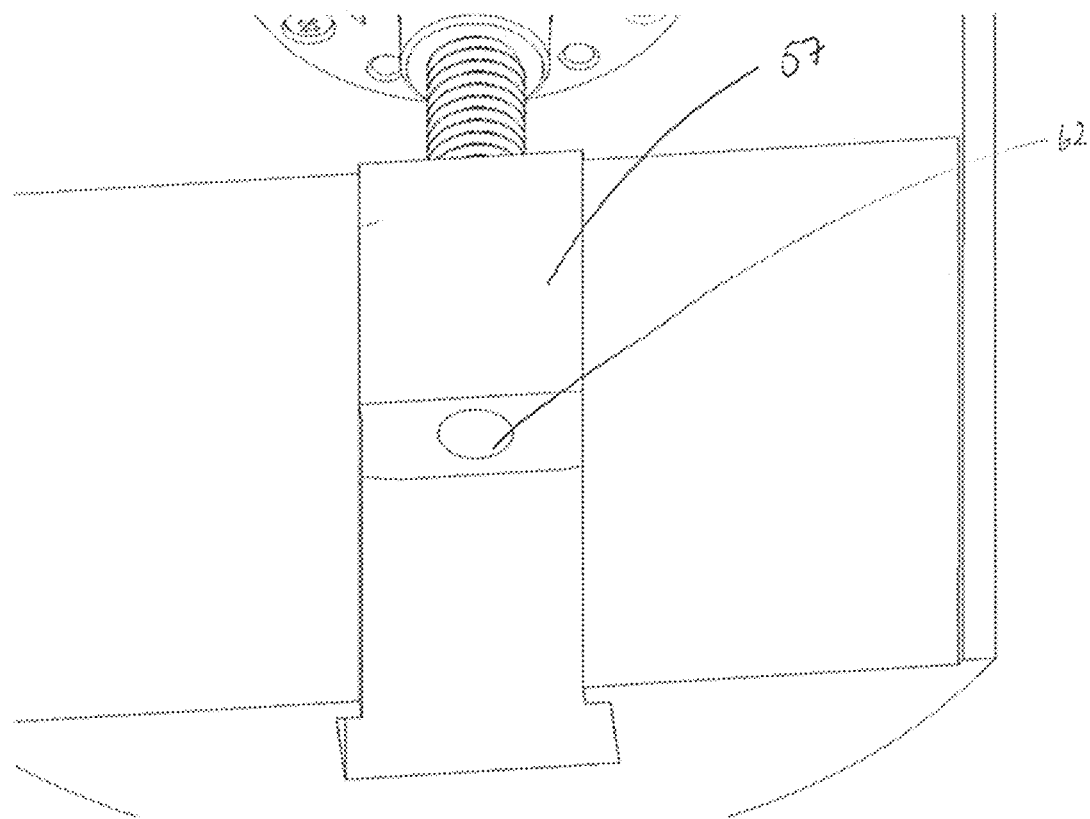
FIG. 5-9 show details of the rolling device arranged for the release of the wheel element.

FIG. 4 shows a solution for enabling the simple replacement of the wheel element 100. Only the components that are relevant for enabling wheel replacement are shown, the remaining components are shown in FIG. 1-3 and described in above with reference to these figures.

Figure 6:
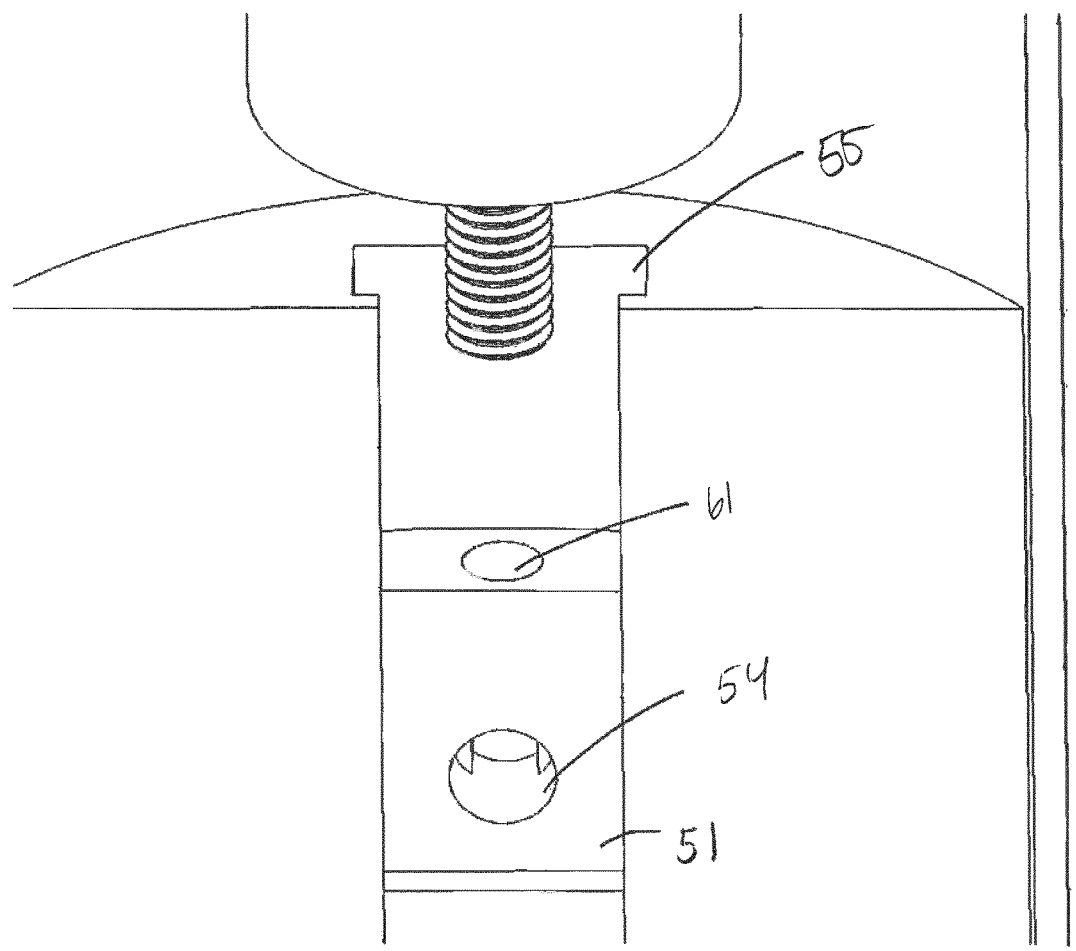

The wheel element 100 has a wheel axle 53 which is connected to a first wheel bearing member 51 at one end portion of the wheel axle 53. The other end portion of the wheel axle 53 is connected to the second wheel bearing member 52, as seen in FIG. 4. The end portions of the wheel axle 53 is connected to the first and the second wheel bearing members 51, 52 through an opening 54 as illustrated in FIG. 6. The first wheel bearing member 51 is accommodated in a first guide recess 55 and the second wheel bearing member is accommodated in a second guide recess (not shown in the figures). The first and the second guide recess may have a T shaped cross section as shown in FIG. 6 and the first and second wheel bearing members 51, 52 may be configured as sliding members capable of displacement within the respective first and second guide recess 55. The guide recesses 51, 52 are arranged in the interior of the housing in its inner wall or in an element arranged along the inner wall such as an interior housing part 90. The guide recesses 51, 52 may also be provided by rails installed at the inner walls of the housing.

The first and second wheel bearing members 51, 52 carrying the wheel element 100 are arranged to be released from the housing 11 as a unit.

The first wheel bearing member 51 is connected to a first guide member 57 which is also arranged for displacement in the first guide recess 51. The first wheel bearing member 51 is connected to a first guide member 57 by releasable attachment means such as magnets 61, 62. The first wheel bearing member 51 may easily be released from connection with the first guide member 57 by applying a release force exceeding the magnetic force between the attachment means, here shown as magnets 61, 62. The release force may typically be provided by a handgrip pulling force from a user.

In the example shown in the FIGS. 2-12, the driving means 60 are arranged in the interior of the wheel element 100, and as such electrical connection between the wheel element 100 and the remaining components as shown in FIG. 1 needs to be established.

Figure 7:
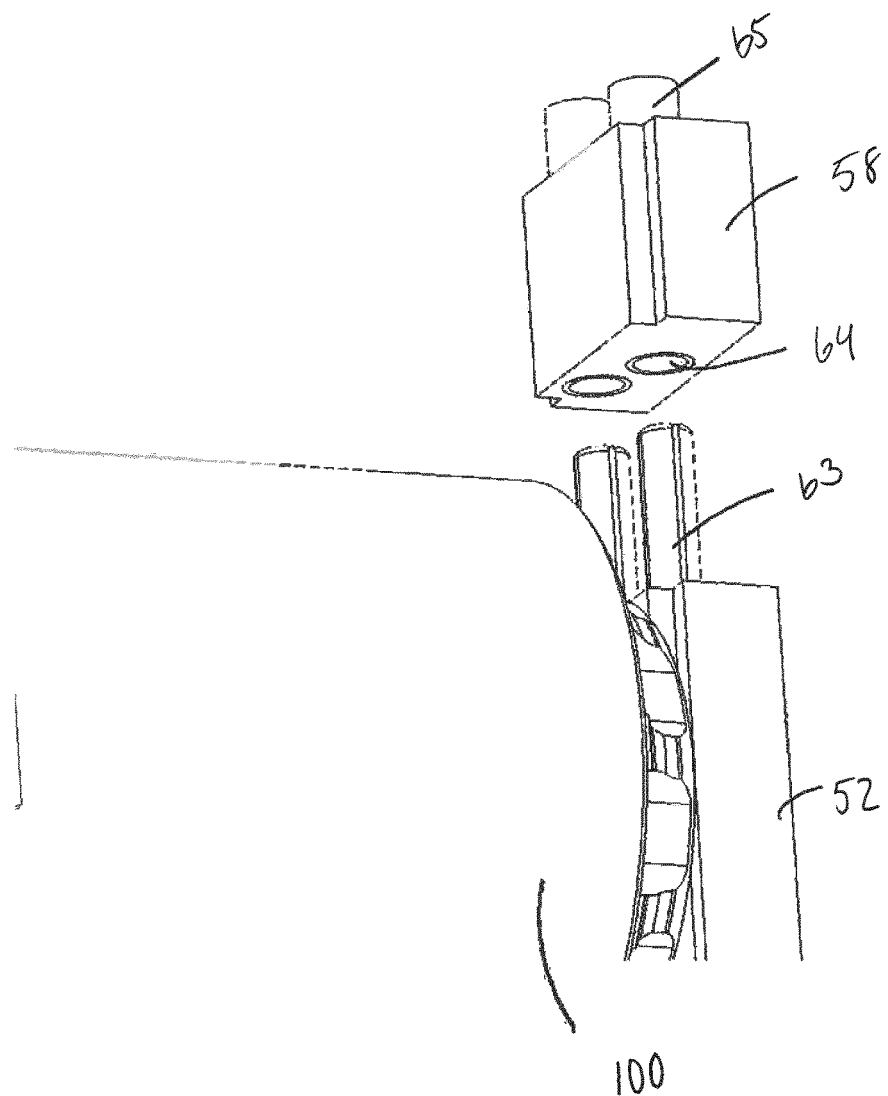

The second wheel bearing member 52 is connected to a second guide member 58 which is also arranged for displacement in the second guide recess, not shown in figures. The second guide member 58 is arranged with first connector parts 63 for connection with second connector parts 64 in order to establish electrical connection between the wheel element and remaining components of FIG. 1. The first and second connector parts may be arranged as plugs and sockets as shown in FIG. 7. Cables 65 for connection to the remaining parts of the roller device 10 is illustrated.

Figure 8:
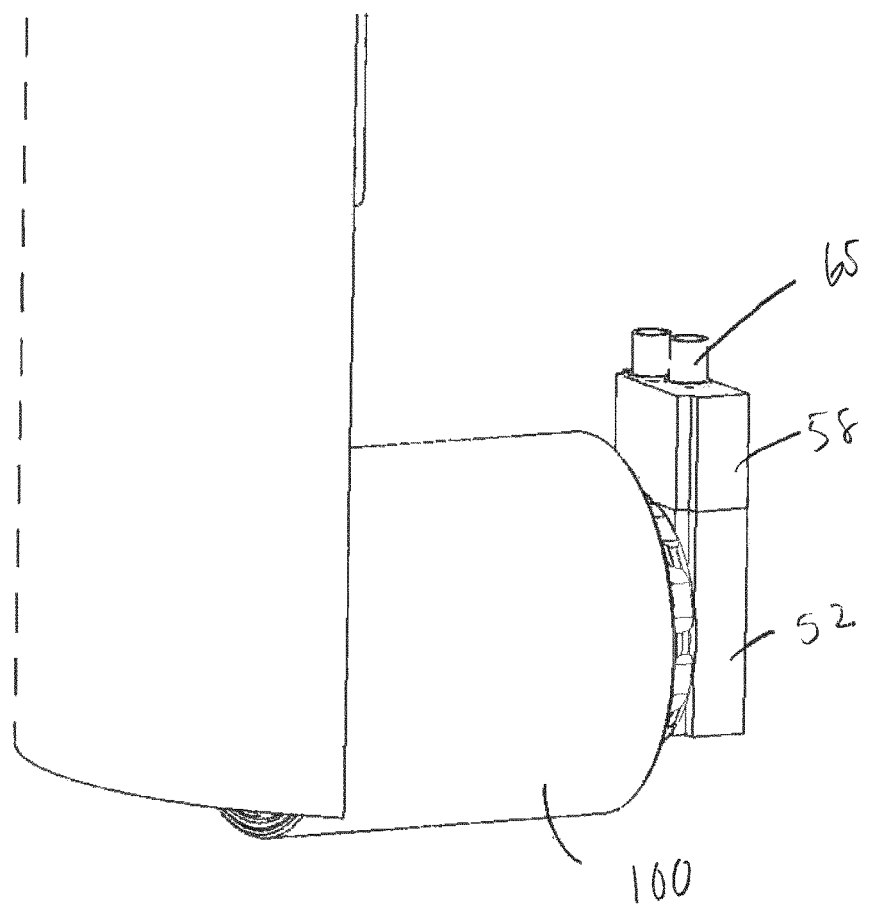

These parts are easy to connect and disconnect and the release may easily be carried out by a handgrip pulling force from a user. FIG. 8 shows the first and second connector parts 63, 64 connected, whereas FIG. 7 shows the connector parts disconnected. If needed magnets may be arranged in addition to the plug and sockets. Other electrical interfaces than plug and sockets may of course may of course also be implemented.

When needing to disengage the wheel element 100, the first and second wheel bearing members 51, 52 are released from engagement with the respective first and second guide member 57, 58. The first and second wheel bearing members 51, 52 are pulled out from the respective first and second guide recesses 55 and the assembly of wheel element 100 and first and second wheel bearing members 51, 52 are released as a unit.

Figure 9:
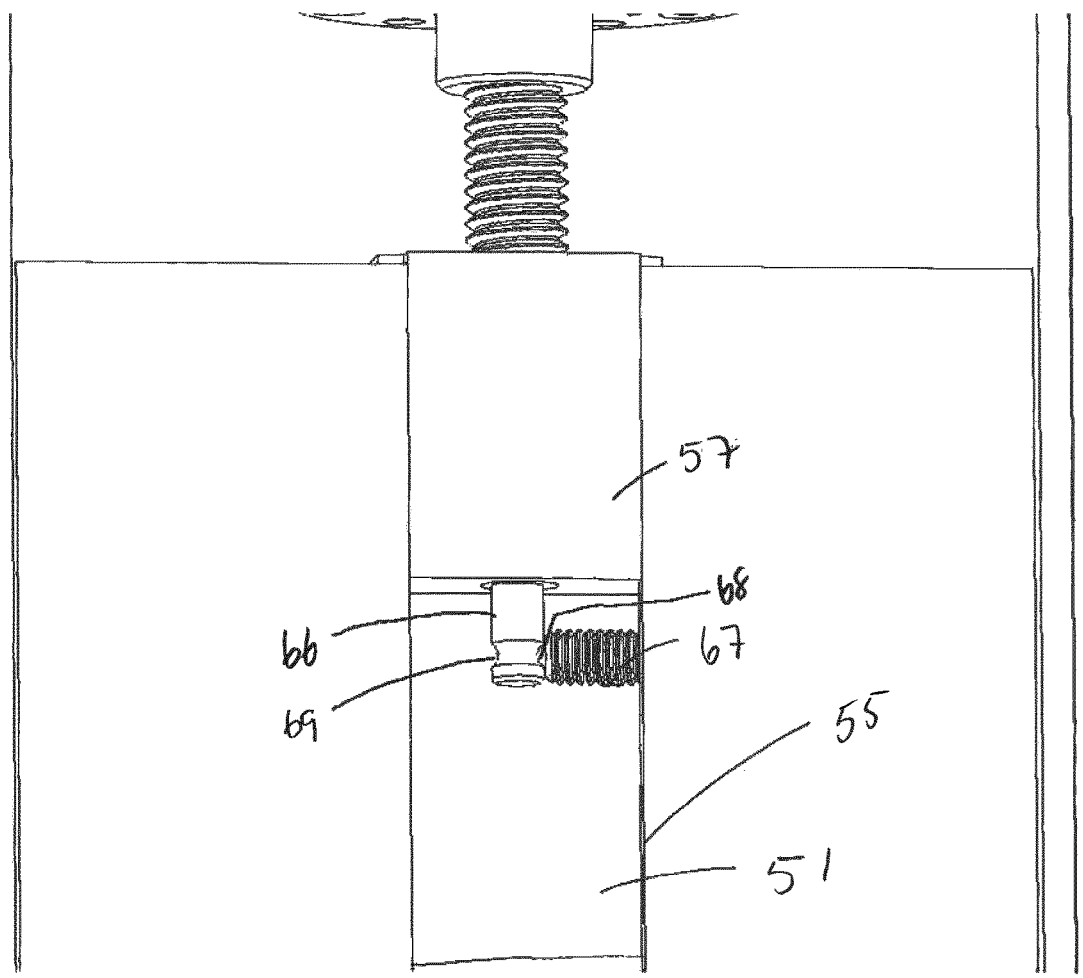

As an alternative to using magnets for providing releasable engagement between wheel bearing members and guide members, a snap or a click in/out connection may be chosen. FIG. 9 shows an example of this solution. The first guide member 57 is shown arranged with a recessed bolt 66 protruding into a suitable hole arranged in the first wheel bearing member 51. A screw element 67 with a spring-loaded ball 68 is positioned transverse to the hole and is arranged to engage the recess 69 of the bolt 66, when the screw element 67 is inserted into the hole. FIG. 9 shows the first guide member 57 and the first wheel bearing member 51 connected. When needing to disconnect, the pulling force from the handgrip of the user easily overcomes the spring force of the ball 68 as positioned in the recess 69, and the first wheel bearing member 51 disengage from the first guide member 57. When later needing to install a new wheel element, the first wheel bearing member 51 is inserted into the first guide recess 55, the spring-loaded ball 68 is compressed in contact with the bolt 66 and snaps into the recess 99 for locking.

It is also possible to use other releasable locking means for the connection of the guide members and the wheel bearing members, such as for instance a releasable claw element engaging with a recess.

FIG. 4-9 shows the rolling device 10 arranged with a drive motor 71 and a gear mechanism which may have a first driving direction for displacement of the wheel element 100 into the retracted position and a second driving direction for displacement of the wheel element 100 into the extended position. A spindle 72 of the drive motor is arranged in engagement with the first guide member 57 to displace the unit of first guide member 57 and the first wheel bearing member 51 in the first guide recess 55 and thereby retract or extend the wheel element 100. The unit of the second guide member 58 and the second wheel bearing member 52 will follow the displacement of the unit of the first guide member 57 and the second wheel bearing member 52, as carried out by the drive motor 71, as both units are connected to the wheel element 100. It is also possible to use two drive motors; one on each side of the wheel element 100 for displacement of each of the guide members 57, 58.

The guide member(s), wheel bearing member(s), interior housing part(s) 90, and wheel element, may be arranged as a module unit such as a cassette to be inserted into and removed from the housing 11. The drive motor 71 may have the location as illustrated in FIG. 4 but may also be provided as shown in FIG. 10-12 where the drive motor 71 is shown with alternative locations and the design of the drive motor 71 is somewhat different.

Figure 10:
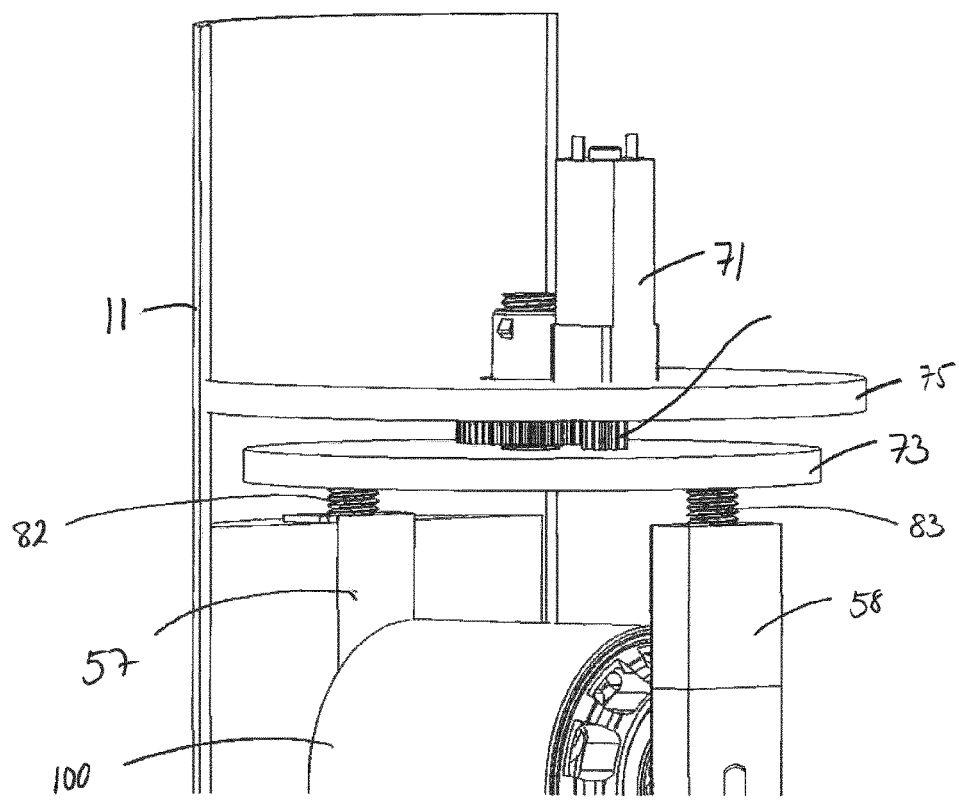
FIG. 10-11 show an alternative embodiment of the arrangement of the rolling device of FIG. 5.
Figure 11:
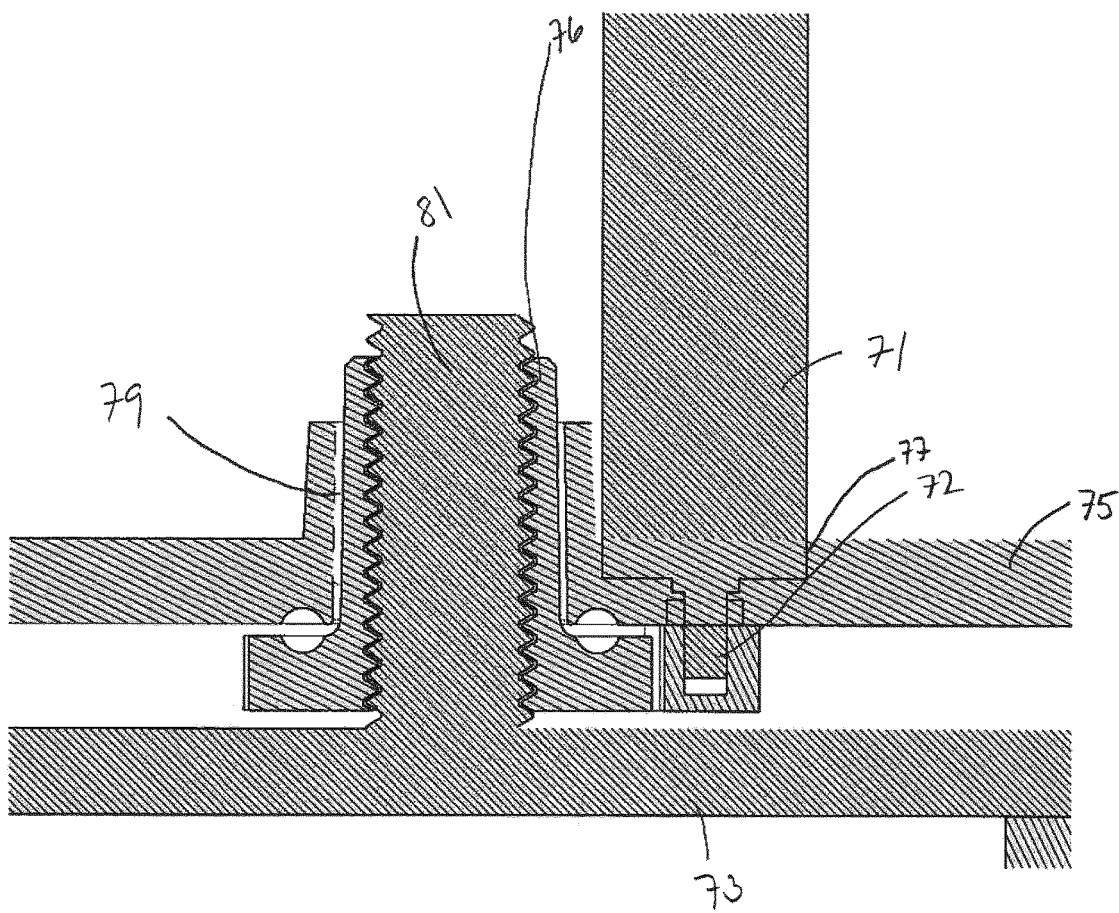

FIGS. 10 and 11 illustrates an alternative arrangement for transferring the torque from the drive motor 71 to the first and second guide members 57, 58. The drive motor 71 is placed on a support structure 75 arranged as part of the housing as shown in FIGS. 10 and 11, or alternatively the support structure 75 may be a separate part attached to the inner wall of the housing. The drive motor 71 is arranged with a spindle 72 extending through a passage of the support structure. A portion of the spindle 72 has a toothed configuration arranged for an intermeshing arrangement with an outer toothed configuration of a sleeve 76. The sleeve 76 is accommodated by a ball bearing arrangement through a second passage 79 which is arranged through the support structure 75. The sleeve 76 is also arranged with an inner toothed configuration that intermeshes with a toothed configuration of cylindrical part 81 connected to a bridge structure 73. The bridge structure 73 has a first attachment section 82 connected to the first guide member 57, and a second attachment section 83 connected to the second guide member 58. When driving the drive motor 71, the spindle 72 rotates the sleeve 76 in the second passage 79 of the support structure 75. The inner teeth of the sleeve 76 forms an intermeshing arrangement with the teeth of the cylindrical part 81 and moves the cylindrical part 81 and thereby the bridge structure 73 upwards or downwards depending on the driving direction of the drive motor 71. When the drive motor 71 runs in the first driving direction the movement of the bridge structure 73 moves the first guide member 57 united with the first wheel bearing member 51, and the second guide member 58 united with the second wheel bearing member 52 upwards, moving the wheel element 100 into the retracted position. And when running the drive motor 71 in the second driving direction, the assembly of bridge structure 73, guide members 57, 58 and wheel bearing members 51, 52 displaces the wheel element 100 into the extended position.

Figure 12:
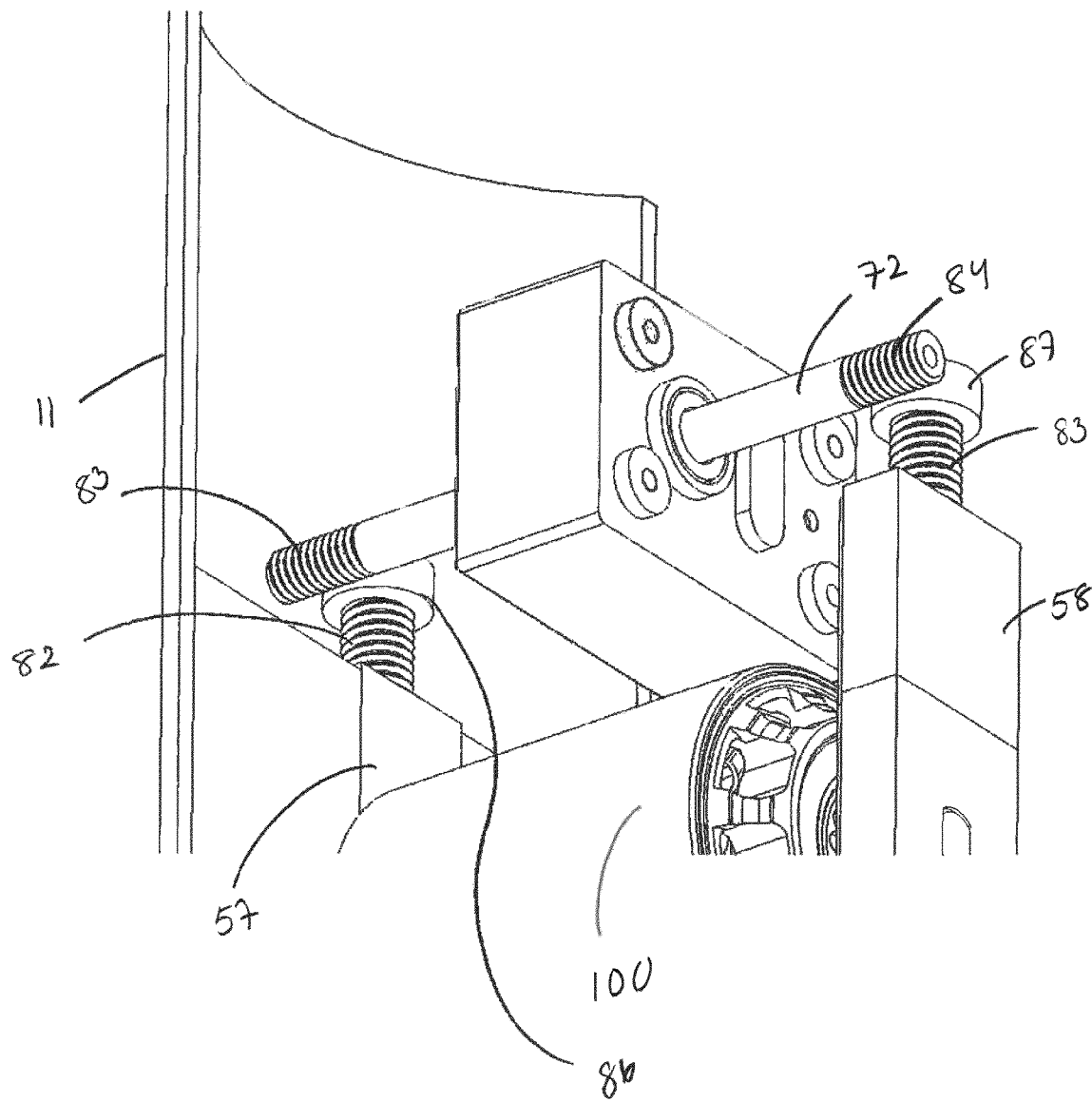
FIG. 12 show further an alternative embodiment of the arrangement of the rolling device of FIG. 5.

FIG. 12 shows an alternative arrangement for transferring the torque from the drive motor 71 by arranging the spindle 72 in a position where the axial axis of the spindle 72 is arranged in parallel with the axial axis of the wheel axle 53. The drive motor 71 is centred above the wheel element 100. The spindle 72 is arranged through the drive motor and centred relative to the drive motor so that a first threaded end portion 83 of the spindle is positioned for intermeshing engagement with the first threaded cap 86 connected to the first attachment section 82. A second threaded end portion 83 of the spindle is positioned for intermeshing engagement with a second threaded cap 87 of the second attachment section 82. The rotational axis of the spindle 72 is orientated essentially perpendicular to the rotational axis of the first and second threaded caps 86, 87. The threaded end portions 83, 84 of the spindle and the threaded caps 86, 87 may have worm screw configurations. When the drive motor 71 runs in the first driving direction upwards, the assembly of attachment sections 82-83, guide members 57, 58 and wheel bearing members 51, 52 displaces the wheel element 100 into retracted position. When running the drive motor 71 in the second driving direction, the assembly of attachment sections 82-83, guide members 57, 58 and wheel bearing members 51, 52 displaces the wheel element 100 into the extended position.

The invention claimed is:

1. A rolling device for a device to enable moving the device along a surface wherein the rolling device comprises:
 a housing arranged for attachment to the device and arranged for accommodation of a rolling element, wherein the housing is arranged for accommodation of a control and communication module comprising;
  a wireless receiver connected to a control device
  position means connected to the control device for acquiring the position of rolling device relative to its surroundings,
 driving means connected to the control device and the rolling element for driving and controlling the movements of the rolling element according to the first position acquired by the position means, and a received wireless signal comprising movement instructions and the second position,
 power supply means for powering the control and communication module and the driving means, wherein
 the housing is arranged with
  a support assembly for bearing the rolling element and is configured for establishing a releasable connection with the housing,
  an electrical interface adapted for establishing connection between the rolling element and at least one the control and communication module and the power supply means.

2. A rolling device in accordance with claim 1, wherein
 the rolling element comprises a wheel element arranged with a wheel axle,
 the support assembly comprises a first and a second wheel bearing member each connected to an end portion of the wheel axle,
 the first wheel bearing member is releasably arranged in a first guiding recess arranged in the interior of the housing,
 the second wheel bearing member is releasably arranged in a second guiding recess arranged in the interior of the housing, wherein
 the first wheel bearing member and the second wheel bearing member carrying the wheel element is to be released from and installed into the housing as a unit.

3. A rolling device in accordance with claim 1, wherein attachment means for establishing releasable connection between the support assembly and the housing is to be selected among the following devices; magnets, click/out connection, releasable claw connection, plug and socket connection.

4. A rolling device in accordance with claim 2, wherein
 a first guide member is arranged in the first guiding recess and is arranged for establishing releasable connection with the first wheel bearing member,
 a second guide member is arranged in the second guiding recess and is arranged for establishing connection with the second wheel bearing member.

5. A rolling device in accordance with claim 4, wherein the rolling device comprises a drive motor wherein
 the first guide member and the first wheel bearing member is connected as a unit,
 the second guide member and the second wheel bearing member is connected as a unit,
and the drive motor is arranged for displacement of the these units in their respective guide recess for moving the wheel element
between an extended position where the wheel element projects outside the housing and a retracted position where the rolling element is located inside housing.

6. A rolling device in accordance with claim 5, wherein the drive motor has a spindle connected to a bridge structure by a toothed intermeshing arrangement, wherein the bridge structure has a first attachment section connected to the first guide member, and a second attachment section connected to the second guide member for displacement of the wheel element between an extended and retracted position.

7. A rolling device in accordance with claim 5, wherein the drive motor is arranged with centred spindle having two free end portions wherein
- one of the end portion forms a toothed intermeshing engagement with a first attachment section connected to the first guide member,
- the other end portion forms a toothed intermeshing engagement with a second attachment section, for displacement of the wheel element between an extended and retracted position.

8. A rolling device in accordance with claim 1, wherein
- the electrical interface comprises a wired interface for communication to and from the roller element, and the second guide member comprises first connector parts the second wheel bearing member comprises second connector parts, wherein the first and second connector parts are arranged in a releasable connection.

9. A rolling device in accordance with claim 1, wherein the rolling element comprises the driving means.

10. A rolling device in accordance with claim 1, wherein the electrical interface comprises a wireless interface for communication to and from the rolling element.

* * * * *